G. WESTINGHOUSE, Jr.
Vacuum-Brake Pipe-Coupling.

No. 166,489.  Patented Aug. 10, 1875.

WITNESSES
Robt Hunt
Claudius L. Parker

INVENTOR
George Westinghouse Jr.
by George H. Christy
his atty.

UNITED STATES PATENT OFFICE.

GEORGE WESTINGHOUSE, JR., OF PITTSBURG, PENNSYLVANIA.

IMPROVEMENT IN VACUUM BRAKE-PIPE COUPLINGS.

Specification forming part of Letters Patent No. 166,489, dated August 10, 1875; application filed March 19, 1875.

*To all whom it may concern:*

Be it known that I, GEORGE WESTINGHOUSE, Jr., of Pittsburg, county of Allegheny, State of Pennsylvania, have invented or discovered a new and useful Improvement in Vacuum Brake-Pipe Coupling; and I do hereby declare the following to be a full, clear, concise, and exact description thereof, reference being had to the accompanying drawing, making a part of this specification, in which like letters indicate like parts.

Figure 1:
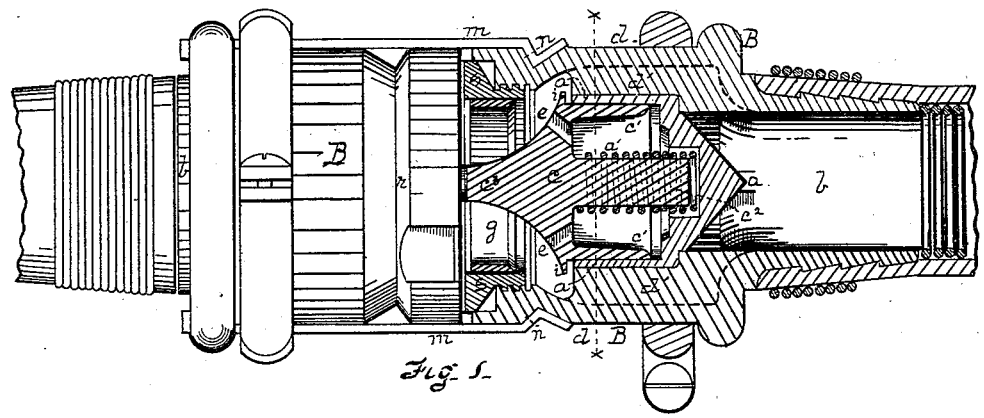
Figure 2:
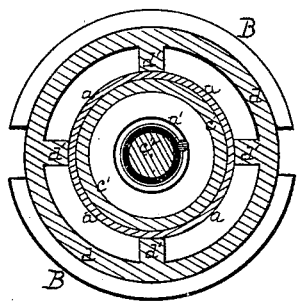

Figure 1 shows a pair of my improved couplings, one-half being in section and the other half in elevation, and Fig. 2 is a cross-section through $x\ x$, Fig. 1.

My present improvement is particularly designed for use in coupling up the brake-pipes in vacuum-power brake apparatus; and for the most part consists in an improvement on the coupling described in Patent No. 136,397, granted to me March 4, 1873.

The couplings B B are connected by the thimbles $b\ b$ with the flexible hose. The main part or body of each half-coupling consists of a shell, $d$, with three or more ribs $d'$ projecting inwardly from its inner cylindrical face. The spaces between these ribs constitute the through passage-way for the air. The inner faces or edges of the ribs $d'$ are bored out true, so as to form a support for the cylindrical valve or piston-case $a$, which is slipped therein, and into its outer open end is inserted a valve, $c$, having a cylindrical guide-barrel, $c^1$, and a stem, $c^2$, on which is arranged a spiral spring, $a'$, which forces the valve out to and holds it to its seat when the couplings are uncoupled. This seat is formed by the inner end of an india-rubber packing-ring, $s$, shaped in cross-section somewhat like an angle iron, and which is inserted in such manner that the radial flanges in two contiguous couplings, coming face to face, shall, by atmospheric pressure acting from without, give an air-tight joint, and the other flange being forced into close contact with the ribbed or corrugated coupling-mouth by means of a ring, $g$, forced in inside its tubular face, shall give a secure joint at that point, and also thereby hold it in place. The valve $c$ seats outward, and at its outer end it terminates in a stem, $c^3$, which in the uniting of the couplings comes against a like stem of the valve in the next coupling, so that in coupling up both valves are thrown off their seats and an open passage-way is provided from the brake-pipe of one car to that of the next.

The couplings are counterparts of each other, and are united by spring-hooks $m$ engaging beveled catches $n$ in the usual manner and for the usual purposes. The brakes may then be applied by the exhaustion of the air in any of the ways known to the art.

The principal object of the valve $c$ is to close the couplings in case they should separate, and also to close and keep closed the rear coupling of the rear car; but in order that (a vacuum or partial vacuum being made inside the brake-pipe) external atmospheric pressure shall act with the least possible force, if at all, in opening or holding open the valves, I make one or more ports, $e$, preferably through the valve-head and inside its annular seating face, so that there will be the same air pressure acting inside the valve to force it outwardly to its seat as there will be outside of it to force it inwardly from its seat, supposing, of course, the area subject to such pressure to be the same on each side of the valve; but in order to get a large area of air-passage I make an annular projection, $i$, on the valve, and use this projection as the seating part of the valve to seat on the rubber ring $s$. Then, to counterbalance the excess of inward pressure resulting from this enlarged area subject to air pressure from without, I make use of the springs $a'$, though preferably the spring is made a little stronger than is required for this purpose, in order that the seating of the valve may be insured in all cases when the couplings are disconnected either accidentally or by design, and such spring I claim as an element in my improved construction, whether used with or without the balancing of the valve, in whole or in part, by air pressure, and regardless of the form of the spring; hence,

What I claim as my invention, and desire to secure by Letters Patent, is—

1. In a pipe-coupling, the valve or piston case $a$ as a carrier and guide for the valve, arranged in the axial line of the coupling by means of radial ribs $d'$ projecting inwardly from the outer shell, substantially as set forth.

2. In a pipe-coupling, the combination of valve $c$, piston extension $c^1$, case $a$, and spring $a'$, arranged substantially as and for the purposes set forth.

3. The annular projection $i$ as the seating part of the valve, in combination with port or ports $e$, and spring $a'$, substantially as set forth.

In testimony whereof I have hereunto set my hand.

GEO. WESTINGHOUSE, JR.

Witnesses:
JAMES M. CHRISTY,
GEORGE H. CHRISTY.